United States Patent Office 3,131,214
Patented Apr. 28, 1964

3,131,214
3-DIMETHYLAMINOMETHYL-4-METHYL-1,8-DISUBSTITUTED NAPHTHALENES
John S. Webb, Woodcliff Lake, N.J., and Carl F. Wolf, Pearl River, and Jerry Robert Daniel McCormick, New City, N.Y., assignors to American Cyanamid Company, New York, N.Y., a corporation of Maine
No Drawing. Filed May 26, 1960, Ser. No. 31,841
13 Claims. (Cl. 260—479)

This invention relates to novel organic compounds and, more particularly, is concerned with novel 3-dimethylaminomethyl-4-methyl-1,8-disubstituted naphthalenes which may be represented by the following general formula:

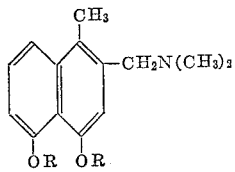

wherein R is hydrogen, lower alkyl, or lower acyl. Suitable lower alkyl substituents are, for example, methyl, ethyl, propyl, isopropyl, butyl, etc. Suitable lower acyl substituents are, for example, acetyl, propionyl, isobutyryl, etc. The present invention also relates to the quaternary ammonium salts of these novel organic compounds as prepared with alkyl halides such as, for example, methyl iodide, ethyl bromide, etc. Also included within the purview of the present invention are the novel intermediate 4-dimethylaminomethyl-1,8-dialkoxy naphthalene quaternary ammonium salts which may be represented by the following general formula:

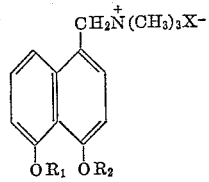

wherein $R_1$ and $R_2$ are lower alkyl and X is halogen.

The free bases of the novel 3-dimethylaminomethyl-4-methyl-1,8-disubstituted naphthalenes of the present invention are, in general, low melting crystalline solids, insoluble in water, but soluble in such solvents as benzene, toluene, chloroform, acetone, ethanol, ethyl acetate, and the like. These free bases form water-soluble acid addition salts with both inorganic and organic acids.

The quaternary ammonium salts of the novel 3-dimethylaminomethyl-4-methyl-1,8-disubstituted naphthalenes of the present invention are, in general, white crystalline solids soluble in water and methanol, but relatively insoluble in solvents such as benzene, toluene, ether, chloroform, ethyl acetate, petroleum ether, and the like.

The novel intermediate 4-dimethylaminomethyl-1,8-dialkoxynaphthalene quaternary ammonium salts of the present invention are, in general, white crystalline solids, soluble in water and methanol but insoluble in organic solvents such as benzene, toluene, ether, chloroform, and the like.

The novel 3-dimethylaminomethyl-4-methyl-1,8-disubstituted naphthalenes and their quaternary ammonium salts of the present invention are useful as insecticides and/or nematocides. For example, 1,8-diacetoxy-4-methyl-3-naphthylmethyltrimethylammonium iodide affords a 90% kill of *Prodenis eridania* (southern armyworm) at a concentration of 0.1% by weight, and a 100% kill of *Turbatrix aceti* (vinegar eel) at a concentration of 1,000 parts per million. The 1,8-dimethoxy-4-methyl-3-naphthylmethyltrimethylammonium iodide affords a 90% kill of *Prodenis eridania* (southern armyworm) at a concentration of 0.1% by weight, and the 3-dimethylaminomethyl-1,8-diacetoxy-4-methylnaphthalene affords a 49% kill of *Aphis rumicis* (aphid) at a concentration of 0.1% by weight.

Certain of the novel 3-dimethylaminomethyl-4-methyl-1,8-disubstituted naphthalenes and their quaternary ammonium salts of the present invention are useful as chelating or complexing agents for polyvalent metallic ions. This, of course, makes them useful for a variety of purposes such as in biological experimentation where the removal of traces of polyvalent metallic ions may be of great importance. The 3-dimethylaminomethyl-4-methyl-1,8-naphthalenediol and its quaternary ammonium salts are particularly useful in this regard in that they readily form 6-membered cyclic borate complexes, and hence dramatically increase the acidity of boric acid solutions.

The novel intermediate 4-dimethylaminomethyl-1,8-dialkoxynaphthalene quaternary ammonium salts of the present invention are not only useful in their capacity as intermediates, but also possess antibacterial activity. For example, the 1,8-dimethoxy-4-naphthylmethyltrimethylammonium iodide has definite gram-positive antibacterial activity.

The novel compounds of the present invention may be readily prepared from 1,8-dialkoxynaphthalenes according to the following reaction scheme:

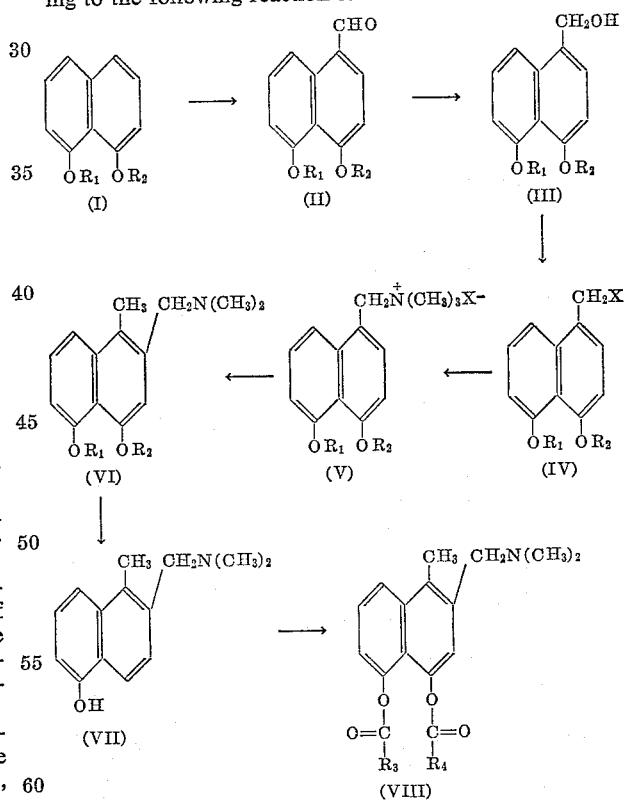

wherein $R_1$ and $R_2$ are lower alkyl, $R_3$ and $R_4$ are lower alkyl, and X is halogen. In accordance with the above reaction scheme, a 1,8-dialkoxynaphthalene (I) is treated with phosphorus oxychloride and dimethylformamide whereby the 4-formyl-1,8-dialkoxynaphthalene (II) is obtained. This is reduced by means of a reducing agent such as sodium borohydride whereby the 4-hydroxymethyl-1,8-dialkoxynaphthalene (III) is obtained. The hydroxymethyl derivative (III) is then converted to the 4-halomethyl-1,8-dialkoxynaphthalene (IV) by treatment with a concentrated aqueous solution of hydrogen halide.

Treatment of the halomethyl derivative (IV) with trimethylamine yields the desired 4-dimethylaminomethyl-1,8-dialkoxynaphthalene methohalide quaternary ammonium salt (V). This reaction is ordinarily carried out in an inert solvent such as tetrahydrofuran, diethyl ether, dioxane, and the like, within a temperature range of from 0° C. to 100° C., and over a period of time ranging from a few minutes to an hour or more.

The 4-dimethylaminomethyl-1,8-dialkoxynaphthalene methohalide quaternary ammonium salt (V) is readily converted to the 3-dimethylaminomethyl-4-methyl-1,8-dialkoxynaphthalene (VI) by treatment with sodium amide in liquid ammonia. This reaction is ordinarily carried out by adding the starting compound (V) to a solution of sodium amide in liquid ammonia over a period of time of from less than a minute to half an hour or so. After the addition is complete, the reaction mixture may be stirred for as long as several hours to allow the reaction to go to completion. Subsequently, the ammonia is removed by evaporation and the product (VI) is recovered from the residue by standard isolation methods.

The 3-dimethylaminomethyl-4-methyl-1,8-dialkoxynaphthalenes (VI) may be readily converted to the 3-dimethylaminomethyl-4-methyl-1,8-naphthalenediol (VII) by treatment with a hydrolytic agent such as, for example, pyridine hydrochloride. The 3-dimethylaminomethyl-4-methyl-1,8-naphthalenediol (VII) may be readily acylated, by standard procedures known to the art, whereby the 3-dimethylaminomethyl-4-methyl-1,8-diacylnaphthalenes (VIII) are obtained.

The quaternary ammonium salts of the novel 3-dimethylaminomethyl-4-methyl-1,8-disubstituted naphthalenes of the present invention are readily prepared by treating the free bases with an excess of an alkyl halide. This reaction is usually carried out by dissolving the free base in a solvent such as tetrahydrofuran, chloroform, dioxane, and the like and thereafter adding the excess of the alkyl halide to the solution. The reaction is ordinarily carried out at about room temperature, and is usually complete within an hour or so. Generally, the product, being insoluble, may be recovered in crude form by a simple filtration.

The invention will be described in greater detail in conjunction with the following specific examples.

EXAMPLE 1

4-Hydroxymethyl-1,8-Dimethoxynaphthalene

A solution of 1.5 g. of sodium borohydride in 5 ml. of water was added to a well stirred solution of 26 g. of 4-formyl-1,8-dimethoxynaphthalene in 150 ml. of ethanol. Stirring was continued for two hours. The mixture was filtered free of inorganic salts and the filtrate was evaporated to dryness. The residue was crystallized from hot benzene; the yield was 24 g. A one gram portion crystallized twice from benzene gave 200 mg., M.P. 99.5–100.5° C.

EXAMPLE 2

4-Bromomethyl-1,8-Dimethoxynaphthalene

A mixture of 4 g. of 4-hydroxymethyl-1,8-dimethoxynaphthalene and 15 ml. of 48% aqueous hydrobromic acid was triturated in a mortar. Benzene was added and the mixture was stirred until all solids were in solution. The benzene phase was separated, washed with water, and dried with magnesium sulfate. The solvent was evaporated until crystals formed. These were collected on a filter, washed with cyclohexane, and air dried. Yield, 1.5 g. of white crystalline material, M.P. 95–99° C. Further attempts to purify this product resulted in broadening the melting point as it was quite unstable.

EXAMPLE 3

4-Chloromethyl-1,8-Dimethoxynaphthalene

This compound was prepared according to the procedure of Example 2 using 1 g. of the hydroxymethyl compound and concentrated hydrochloric acid whereby 350 mg. of a white crystalline compound, M.P. 108–109.5° C., was obtained.

EXAMPLE 4

1,8-Dimethoxy-4-Naphthylmethyltrimethylammonium Chloride

A solution of 200 mg. of 4-chloromethyl-1,8-dimethoxynaphthalene in tetrahydrofuran was treated with a stream of trimethylamine gas for 5 minutes. The solution became warm and opalescent and on cooling thickened to a paste. The solvent was evaporated and the residue washed with boiling dioxane giving the product as white crystalline material, M.P. 226–228° C.

EXAMPLE 5

1,8-Dimethoxy-4-Naphthylmethyltrimethylammonium Bromide

This compound was prepared according to the procedure of Example 4 by reacting 2 g. of the bromomethyl analog, in 20 ml. of tetrahydrofuran, with trimethylamine. Workup gave 2.4 g. of crystalline product.

EXAMPLE 6

3-Dimethylaminomethyl-1,8-Dimethoxy-4-Methylnaphthalene

To a well stirred solution of 800 mg. of sodium amide in 20 ml. of liquid ammonia was added, over a five minute period, 2.4 g. of 1,8-dimethoxy-4-naphthylmethyltrimethylammonium bromide. After stirring for 3 hours the reaction mixture was evaporated to dryness and water and benzene added. When all solids were in solution, the benzene phase was separated, dried with magnesium sulfate, and evaporated to dryness. The residual oil which solidified on scratching was recrystallized from ethanol to give the product as light yellow crystals, M.P. 88–90° C.

EXAMPLE 7

1,8-Dimethoxy-4-Methyl-3-Naphthylmethyltrimethylammonium Iodide

A solution of 3-dimethylaminomethyl-1,8-dimethoxy-4-methylnaphthalene in 20 ml. of tetrahydrofuran was treated with excess methyl iodide. After one hour the crude product was recovered by filtration, crystallized from ethanol, and dried, giving crystals which melted at 193–196° C.

EXAMPLE 8

3-Dimethylaminomethyl-1,8-Diacetoxy-4-Methylnaphthalene

A mixture of 27 g. of freshly distilled pyridine hydrochloride and 5 g. of 3-dimethylaminomethyl-1,8-dimethoxy-4-methylnaphthalene was heated in an oil bath, under nitrogen at 210° C., for 30 minutes. Then, 25 g. of sodium acetate and 50 ml. of acetic anhydride was added and the mixture heated at reflux for 40 minutes. The mixture was filtered free of inorganic salts and the filtrate evaporated to dryness. The residue was dissolved in water and saturated sodium bicarbonate was added to neutralize residual acetic acid and acetic anhydride. The aqueous solution was extracted 4 times with ethyl acetate. The combined ethyl acetate extracts were dried with magnesium sulfate and evaporated to dryness. The residue was recrystallized from 250 ml. of hot cyclohexane to give the product which had a melting point of 127–128° C.

EXAMPLE 9

1,8-Diacetoxy-4-Methyl-3-Naphthyl Methyltri-Methylammonium Iodide

A solution of 500 mg. of 3-dimethylaminomethyl-1,8-diacetoxy-4-methylnaphthalene in 5 ml. of tetrahydrofuran was treated with excess methyl iodide. After 1 hour the product was filtered from the reaction mixture and dried, M.P. 194–201° C.

What is claimed is:
1. A compound selected from the group consisting of 3 - dimethylaminomethyl-4-methyl-1,8-disubstituted naphthalenes of the formula:

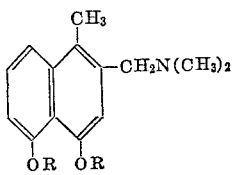

wherein R is selected from the group consisting of hydrogen, lower alkyl, and lower alkanoyl; the acid addition salts thereof; and the quaternary ammonium salts thereof with lower alkyl halides selected from the group consisting of the chlorides, bromides and iodides.

2. 3 - dimethylaminomethyl - 4 - methyl - 1,8 - naphthalenediol.

3. 3 - dimethylaminomethyl - 4 - methyl - 1,8 - naphthalenediol hydrochloride.

4. 1,8 - dihydroxy - 4 - methyl - 3 - naphthylmethyltrimethylammonium iodide.

5. 3 - dimethylaminomethyl - 1,8 - dimethoxy - 4 - methylnaphthalene.

6. 3 - dimethylaminomethyl - 1,8 - dimethoxy - 4 - methylnaphthalene hydrobromide.

7. 1,8 - dimethoxy - 4 - methyl - 3 - naphthylmethyltrimethylammonium iodide.

8. 3 - dimethylaminomethyl - 1,8 - diacetoxy - 4 - methylnaphthalene.

9. 3 - dimethylaminomethyl - 1,8 - diacetoxy - 4 - methylnaphthalene hydrochloride.

10. 1,8 - diacetoxy - 4 - methyl - 3 - naphthylmethyltrimethylammonium iodide.

11. 1,8 - disubstituted - 4 - naphthylmethyltrimethylammonium halides having the general formula:

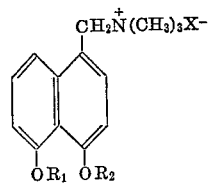

wherein $R_1$ and $R_2$ are lower alkyl and X is halogen.

12. 1,8 - dimethoxy - 4 - naphthylmethyltrimethylammonium chloride.

13. 1,8 - dimethoxy - 4 - naphthylmethyltrimethylammonium bromide.

References Cited in the file of this patent
UNITED STATES PATENTS

| | | |
|---|---|---|
| 2,119,077 | Hill et al. | May 31, 1938 |
| 2,498,875 | Bock et al. | Feb. 28, 1950 |
| 2,772,310 | Morris | Nov. 27, 1956 |
| 2,895,995 | Willey | July 21, 1959 |
| 2,926,193 | Rigterink | Feb. 23, 1960 |
| 2,962,531 | Coffield | Nov. 29, 1960 |

OTHER REFERENCES

Beilstein: Handbuch der Organischen Chemie, vol. 13, p. 806 (1930).
Dey et al.: C.A., vol. 34, p. 5085 (1940).
Adams et al.: J.A.C.S., vol. 63, pp. 528–534 (1941).
Baker et al.: J.A.C.S., vol. 64, pp. 1096–1101 (1942).
Snyder et al.: J.A.C.S., vol. 71, pp. 1058–1060 (1949).
Kantor et al.: J.A.C.S., vol. 73, pp. 4122–4130 (1951).
Oyama et al.: C.A., vol. 47, pp. 4866–4867 (1943).
Buu-Hoi et al.: Bull. soc. chim. France, 5th Series, vol. 22, pp. 1419–1421 (1955).
Corral et al.: C.A., vol. 50, pp. 12935–12936 (1956).
Loder et al.: J. Chem. Soc. (London), vol. of 1957, pp. 2233–2237.
Van Enamet et al.: J.A.C.S., vol. 79, pp. 5520–5524 (1957).
Corral et al.: C.A., vol. 52, pp. 6283–6284 (1958).
Wagner et al.: "Synthetic Organic Chemistry," pp. 89, 90, 149, 171, 482 (1953).